United States Patent [19]

Kielma

[11] 4,190,948
[45] Mar. 4, 1980

[54] VERTICAL SPINDLE MACHINE TOOL WITH TILTABLE SPINDLE AND TILTABLE AUTOMATIC TOOL CHANGER

[75] Inventor: Ervin J. Kielma, West Allis, Wis.

[73] Assignee: Kearney & Trecker Corporation, West Allis, Wis.

[21] Appl. No.: 966,906

[22] Filed: Dec. 6, 1978

[51] Int. Cl.² .......................................... B23Q 3/157
[52] U.S. Cl. .................................................... 29/568
[58] Field of Search .......................... 29/568; 90/15 A

[56] References Cited

U.S. PATENT DOCUMENTS

| | | | |
|---|---|---|---|
| 2,750,851 | 6/1956 | Berthiez | 90/17 |
| 3,344,512 | 10/1967 | Zucchellini | 29/568 |
| 3,452,642 | 7/1969 | Balding | 90/17 |
| 3,650,178 | 3/1972 | Appleton | 90/15 R |

*Primary Examiner*—Z. R. Bilinsky
*Attorney, Agent, or Firm*—Cyril M. Hajewski

[57] ABSTRACT

The spindle head of a gantry type vertical spindle machining center is slidably mounted on a spindle base which is pivotally mounted on the saddle for rocking movement about a horizontal axis to cause the axis of the spindle to tilt from the vertical. A tool storage magazine is mounted on the spindle base and is tiltable along with the spindle to enable toolholders to be transferred between the spindle and tool storage magazine at any spindle tilt angle. A tool changer arm is mounted on the tool storage magazine for transferring tools between the spindle and the tool storage magazine.

3 Claims, 4 Drawing Figures

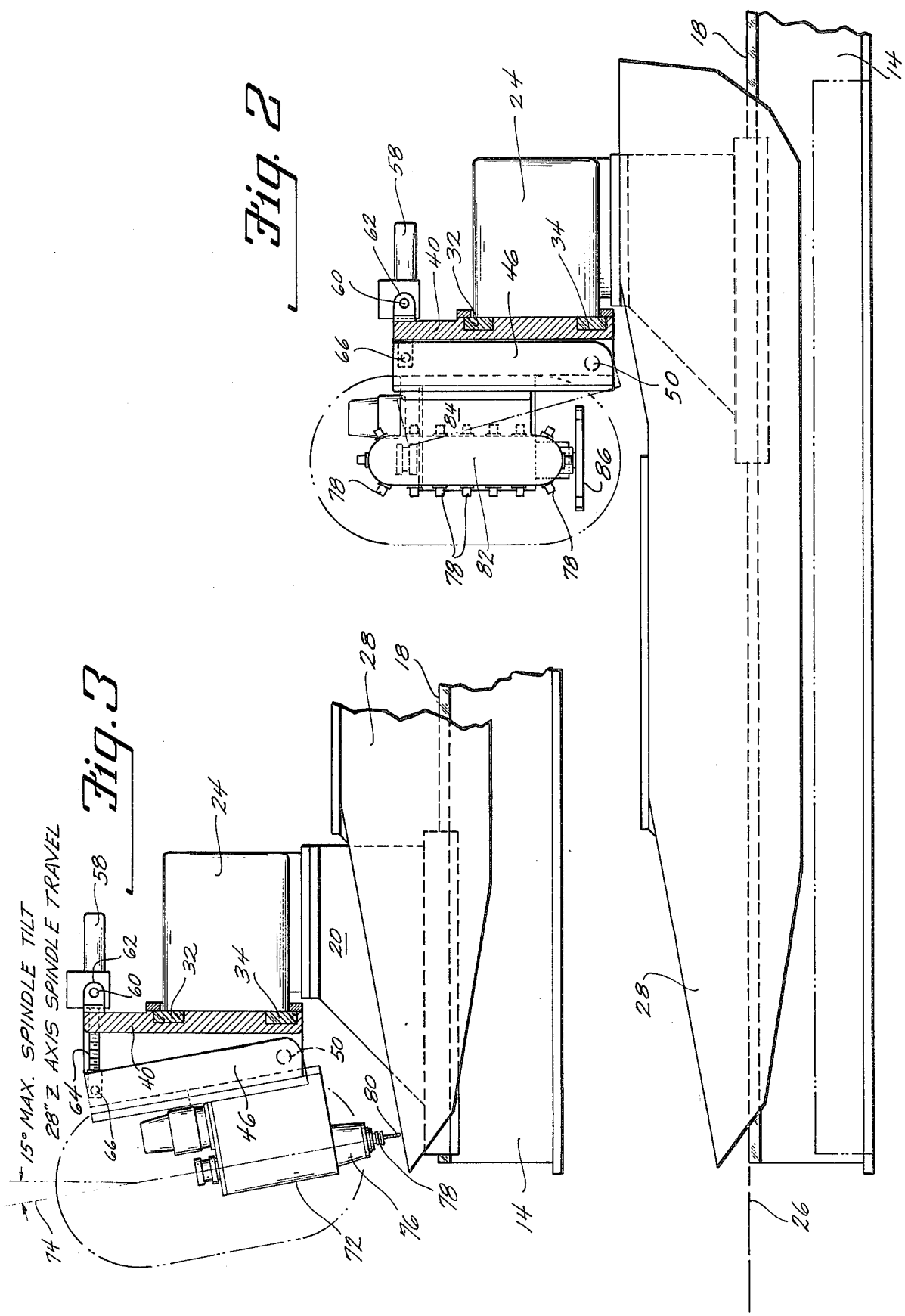

VERTICAL SPINDLE MACHINE TOOL WITH TILTABLE SPINDLE AND TILTABLE AUTOMATIC TOOL CHANGER

BACKGROUND OF THE INVENTION

This invention relates to vertical spindle machine tools in which the spindle is tiltable and in which an automatic tool changer is employed. In the past, the automatic tool changer of such machine tools was mounted in a stationary position with respect to the tiltable spindle, which required that the spindle be returned to its vertical position before a tool change could be effected.

The principal object of this invention is to provide a tiltable vertical spindle machine tool in which a tool change can be effected at any spindle tilt angle. Other objects and advantages of the invention will be apparent from the detailed description herein.

SUMMARY OF THE INVENTION

A spindle base is pivotally mounted on a frame for rocking movement about a horizontal axis. A spindle head is slidably mounted on the spindle base for linear movement along a substantially vertical axis which tilts in response to rocking movement of the base about its horizontal axis. A spindle is rotatably mounted on the spindle head and is adapted to receive a toolholder and to clamp the toolholder therein. A tool storage magazine is mounted on the spindle base and is tiltable along with the spindle to enable toolholders to be transferred between the spindle and the tool storage magazine at any spindle tilt angle. A tool changer arm is mounted on the tool storage magazine for transferring toolholders between the spindle and the tool storage magazine.

BRIEF DESCRIPTION OF THE DRAWINGS

FIG. 2 is a side elevational view taken on the line 2—2 of FIG. 1 showing the spindle and automatic tool changer in their vertical position;

FIG. 3 is a side elevational view similar to FIG. 2 showing the spindle and automatic tool changer in their tilted position.

DESCRIPTION OF THE PREFERRED EMBODIMENTS

Figure 1:
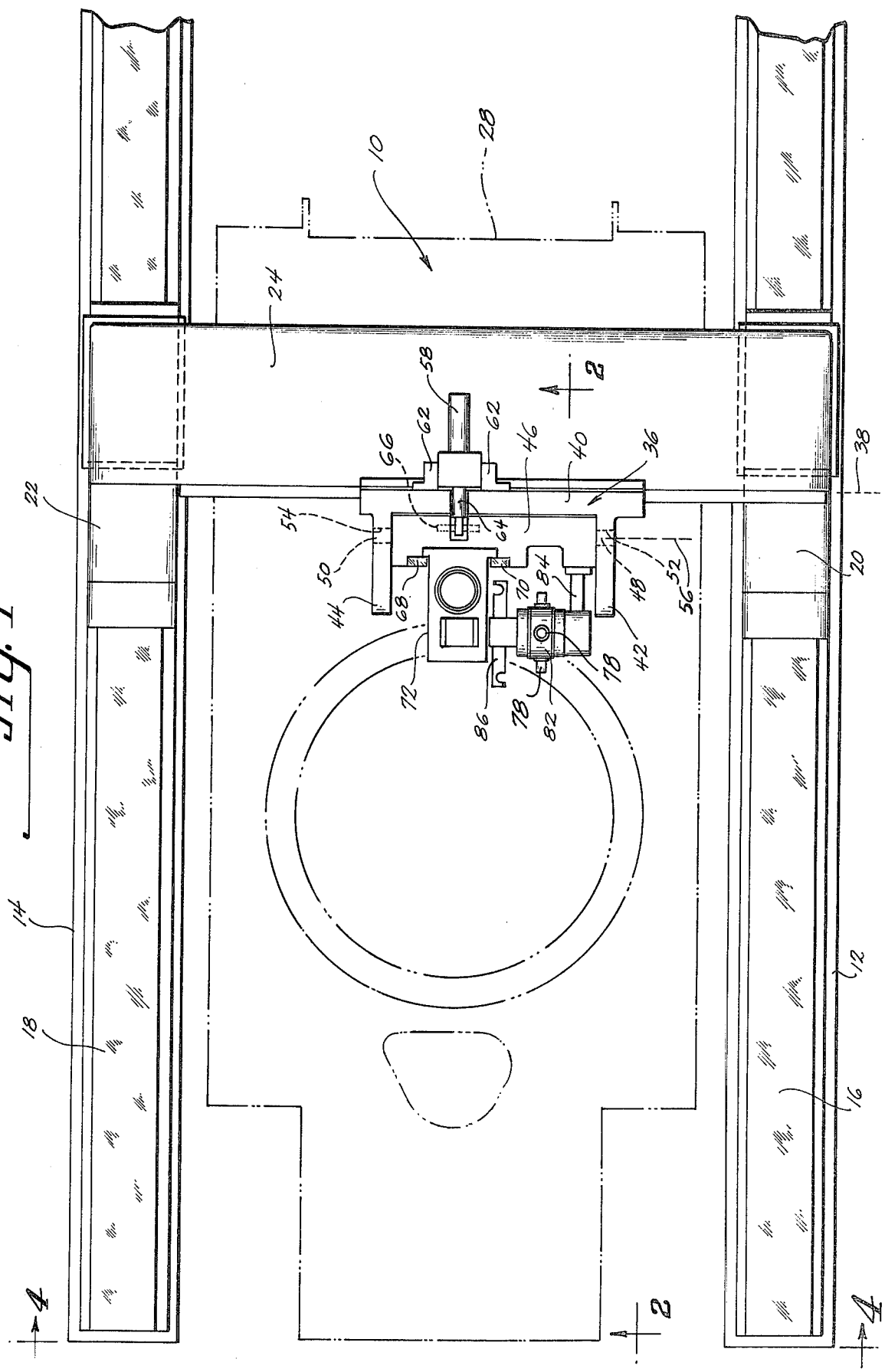
FIG. 1 is a plan view of a preferred embodiment of the invention.
Figure 4:
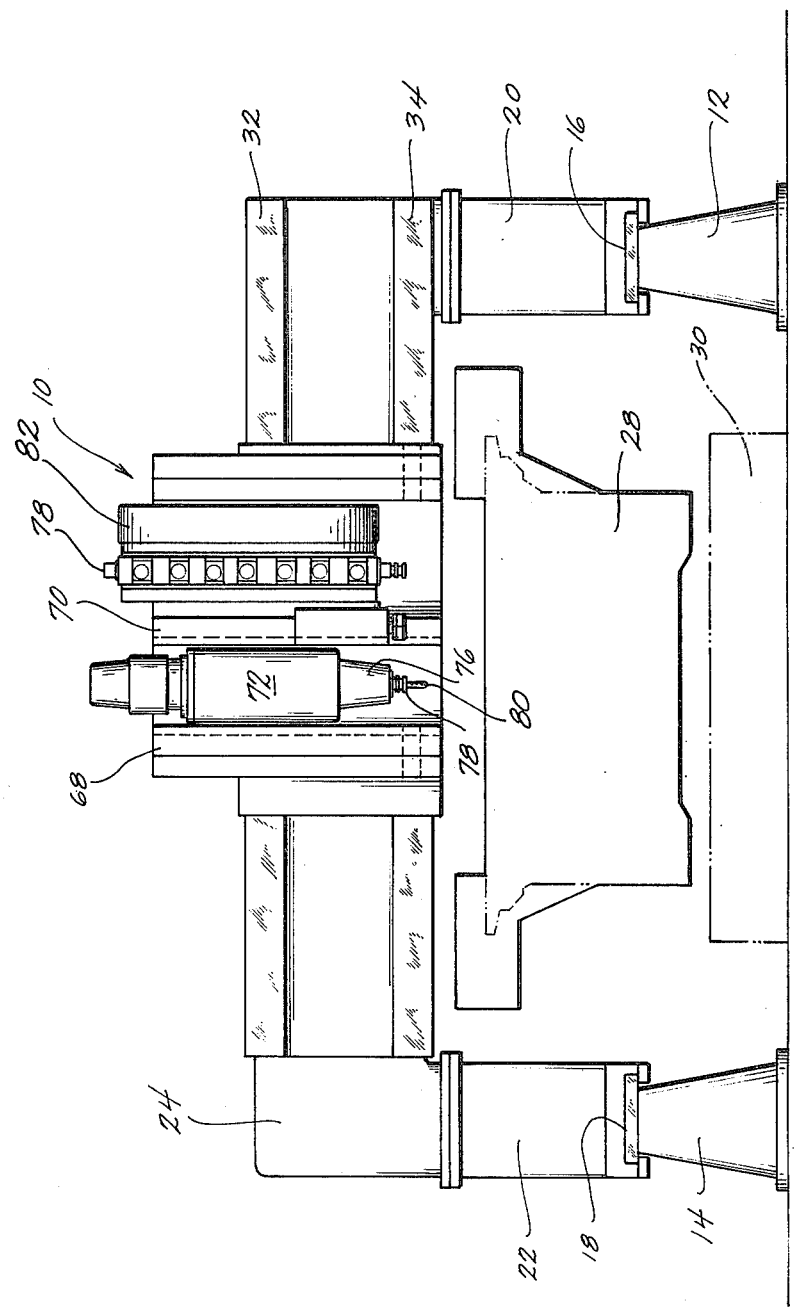
FIG. 4 is a front elevational view taken on the line 4—4 of FIG. 1.

The drawings show one preferred embodiment of the invention in combination with a gantry type vertical spindle machining center 10 (FIG. 1). Machining center 10 is supported by two elongated bed portions 12 and 14 which are arranged in spaced parallel relationship. A pair of horizontal ways 16 and 18 are mounted on top of bed portions 12 and 14 and slidably support gantry shoes 20 and 22 which, in turn, support a gantry bridge 24. Gantry bridge 24 extends between bed portions 12 and 14 and is slidable along a horizontal X axis 26 (FIG. 2) between a rearward position shown in FIG. 2 and a forward position shown in FIG. 3. Gantry bridge 24 and gantry shoes 20 and 22 are driven along X axis 26 by conventional drive means (not shown). Gantry bridge 24 spans the workpiece which in this example is a tank hull 28 (FIG. 2) supported by a conventional fixture 30 (FIG. A) between bed portions 12 and 14.

A pair of horizontal ways 32 and 34 are mounted on gantry bridge 24 and slidably support a saddle 36 (FIG. 1) which is slidable along a horizontal Y axis 38 by means of a conventional Y axis drive (not shown). Saddle 36 has a base plate 40 and two side plates 42 and 44 (FIG. 1) which project at right angles from base plate 40 and are spaced apart from each other. Saddle base plate 40 and side plates 42 and 44 are U-shaped in plan configuration.

A spindle base 46 is pivotally mounted on saddle 36 by trunnions 48 and 50 which engage matching openings 52 and 54 in saddle side plates 42 and 44. Spindle base 46 is rockable about a horizontal axis 56 which is parallel to Y axis 38. Trunnions 48 and 50 are located at the bottom of spindle base 46 as best shown in FIG. 2. The angular position of spindle base 46 is controlled by an electric motor 58 which is pivotally mounted on saddle base plate 40 and is coupled to the top of spindle base 46 (FIG. 1) by a conventional ball screw mechanism (not shown). Motor 58 is pivotally mounted on saddle base plate 40 by trunnions 60 (FIG. 2) which engage openings in brackets 62 attached to saddle base plate 40. The shaft 64 (FIG. 1) of the ball screw mechanism which is driven by motor 58 is pivotally attached to a pivot pin 66 (FIG. 2) at the top of spindle base 46.

Spindle base 46 supports a pair of vertical ways 68 and 70 (FIG. 1) upon which a spindle head 72 is slidably mounted for movement along a Z axis (FIG. 3) which tilts from the vertical in response to rocking motion of spindle base 46 about axis 56 (FIG. 1). A spindle 76 (FIG. 3) is rotatably mounted on spindle head 72 for rotation about axis 74. Spindle 76 is driven by conventional drive means (not shown) and is adapted to receive a toolholder 78 carrying a tool 80 for performing work on workpiece 28.

A conventional tool storage magazine 82 (FIG 1) is mounted on spindle base 46 by bracket 84 in a position adjacent to spindle 76. Tool storage magazine 82 is adapted to receive and to store a plurality of toolholders 78 (FIG. 2). A tool changer arm 86 (FIG. 1) is mounted on tool storage magazine 82 to transfer toolholders 78 from tool storage magazine 82 to spindle 76 or vice versa. When spindle base 46 is rocked about axis 56 to tilt Z axis 74 (FIG. 2), tool storage magazine 82 (FIG. 1) and tool changer arm 86 tilt by the same angle since they are also mounted on spindle base 46. This enables tool changer arm 86 to transfer toolholders between tool storage magazine 82 and spindle 76 (FIG. 3) at any tilt angle of Z axis 74.

In this particular embodiment of the invention, Z axis 74 can be tilted up to 15 degrees from the vertical, but it will be obvious that larger or smaller maximum tilt angles can be employed with the above-described tilt structure. Tilt motor 58, which determines the degree of tilt, is controlled by conventional motor control circuitry (not shown) and can be energized to achieve any desired tilt angle between the vertical (FIG. 2) and the maximum tilt angle (FIG. 3) in response to appropriate control signals.

Although this particular embodiment is used in combination with a gantry type vertical spindle machining center, the invention is applicable to any vertical spindle machine tool. In this embodiment, saddle 36 acts as a frame upon which the tiltable components are pivotally mounted, but in other embodiments, the tiltable components may be pivotally mounted on an upright.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. A vertical spindle machine tool comprising:
   a frame;
   a spindle base pivotally mounted on said frame for rocking movement about a horizontal axis;
   a spindle head slidably mounted on said spindle base for linear movement along a substantially vertical axis which tilts in response to rocking movement of said base about said horizontal axis;
   a spindle rotatably mounted on said spindle head for rotation about said substantially vertical axis, said spindle being adapted to receive a toolholder and to clamp said toolholder therein;
   a tool storage magazine mounted on said spindle base, said tool storage magazine being adapted to receive and to store a plurality of toolholders, and said tool storage magazine being tiltable along with said spindle to enable toolholders to be transferred between said tool storage magazine and said spindle at any spindle tilt angle; and
   transfer means mounted for tiltable movement with said base and said magazine for transferring toolholders between said spindle and said tool storage magazine.

2. The machine tool of claim 1 wherein said frame comprises the saddle of a gantry type vertical spindle machine tool.

3. The machine tool of claim 1 wherein said means for transferring toolholders between said spindle and said tool storage magazine comprises a tool changer arm mounted on said tool storage magazine.

* * * * *